US012236562B2

(12) United States Patent
Hua et al.

(10) Patent No.: US 12,236,562 B2
(45) Date of Patent: *Feb. 25, 2025

(54) ERROR HANDLING IN A GEOMETRIC CORRECTION ENGINE

(71) Applicant: TEXAS INSTRUMENTS INCORPORATED, Dallas, TX (US)

(72) Inventors: Gang Hua, Katy, TX (US); Rajasekhar Reddy Allu, Plano, TX (US); Niraj Nandan, Plano, TX (US); Mihir Narendra Mody, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/465,250

(22) Filed: Sep. 12, 2023

(65) Prior Publication Data

US 2023/0419462 A1 Dec. 28, 2023

Related U.S. Application Data

(63) Continuation of application No. 17/119,714, filed on Dec. 11, 2020, now Pat. No. 11,756,169.

(60) Provisional application No. 62/956,377, filed on Jan. 2, 2020.

(51) Int. Cl.
*G06T 5/80* (2024.01)
*G06T 3/18* (2024.01)
*G06T 7/60* (2017.01)
*G06T 11/40* (2006.01)

(52) U.S. Cl.
CPC .................. *G06T 5/80* (2024.01); *G06T 3/18* (2024.01); *G06T 7/60* (2013.01); *G06T 11/40* (2013.01); *G06T 2207/20021* (2013.01)

(58) Field of Classification Search
CPC ........... G06T 5/006; G06T 2207/20021; G06T 3/0018; G06T 3/4038; G06T 1/60; G06T 3/0093
See application file for complete search history.

(56) References Cited

U.S. PATENT DOCUMENTS

| | | |
|---|---|---|
| 2005/0063586 A1 | 3/2005 | Munsil et al. |
| 2009/0179773 A1* | 7/2009 | Denny ...................... G06T 7/80 340/901 |
| 2012/0044387 A1 | 2/2012 | Usami |
| 2019/0096041 A1 | 3/2019 | Allu et al. |

(Continued)

OTHER PUBLICATIONS

"TDA4VM Jacinto Automotive Processors for ADAS and Autonomous Vehicles Silicon Revision 1.0", SPRSP36E, Texas Instruments, Inc., Feb. 2019, Revised Dec. 2019, pp. 1-311.

(Continued)

*Primary Examiner* — Xiao M Wu
*Assistant Examiner* — Scott E Sonners
(74) *Attorney, Agent, or Firm* — Brian D. Graham; Frank D. Cimino

(57) ABSTRACT

A method for error handling in a geometric correction engine (GCE) is provided that includes receiving configuration parameters by the GCE, generating, by the GCE in accordance with the configuration parameters, output blocks of an output frame based on corresponding blocks of an input frame, detecting, by the GCE, a run-time error during the generating, and reporting, by the GCE, an event corresponding to the run-time error.

20 Claims, 9 Drawing Sheets

(56) References Cited

U.S. PATENT DOCUMENTS

2019/0096042 A1    3/2019    Allu et al.
2019/0096077 A1    3/2019    Allu et al.
2020/0349683 A1   11/2020    Allu et al.

OTHER PUBLICATIONS

"Mesh Lens Distortion Correction (Mesh LDC)", Texas Instruments, Inc., Jan. 28, 2020, pp. 72-91.
International Search Report and Written Opinion of the PCT/US 2021012041 dated Apr. 15, 2021; 8 pages.

* cited by examiner

ERROR HANDLING IN A GEOMETRIC CORRECTION ENGINE

CROSS-REFERENCE TO RELATED APPLICATIONS

This application is a continuation of U.S. patent application Ser. No. 17/119,714, filed Dec. 11, 2020, which claims the benefit of and priority to U.S. Provisional Patent Application No. 62/956,377, filed Jan. 2, 2020, each of which is incorporated herein by reference in its entirety.

BACKGROUND

Cameras with wide angle lens, e.g., fisheye cameras, are being used in an increasing number of applications such as surveillance, robotic vision, automotive rear-view imaging systems, automotive surround view imaging systems, etc. to provide a 180+° field of view. While such lenses provide very large wide-angle views, the images produced may be severely distorted when the hemispherical scene is projected onto a flat surface for viewing. Therefore, the images captured by such cameras are corrected to approximately rectilinear versions before being presented to viewers. In real-time applications, a geometric correction engine (GCE) may be included in a video processing accelerator in a system-on-a-chip (SoC) to perform geometric image transforms on images from such wide angle lenses to correct the distortion. The GCE may also perform image perspective changes and stereo rectification.

SUMMARY

Embodiments of the present disclosure relate to error handling in a geometric correction engine (GCE). In one aspect, a method for error handling in a geometric correction engine (GCE) is provided that includes receiving configuration parameters by the GCE, generating, by the GCE in accordance with the configuration parameters, output blocks of an output frame based on corresponding blocks of an input frame, detecting, by the GCE, a run-time error during the generating, and reporting, by the GCE, an event corresponding to the run-time error.

In one aspect, a system-on-a-chip (SoC) is provided that includes a geometric correction engine (GCE) configured to receive configuration parameters from a user supplied control program, generate, in accordance with the configuration parameters, output blocks of an output frame based on corresponding input blocks of an input frame, detect a run-time error while generating the output blocks, and report an event corresponding to the run-time error to the user supplied control program, a memory configured to store software instructions implementing the user supplied control program for the GCE, and at least one processor coupled to the memory to execute the software instructions.

In one aspect, a geometric correction engine (GCE) is provided that includes a transform component configured to apply a perspective transform to coordinates of corners of an output block of an output frame to generate first perspective warped coordinates, compute coordinates of corners of a mesh look-up table (LUT) block in a mesh LUT using the first perspective warped coordinates, wherein the mesh LUT block corresponds to the output block, and detect and report a first run-time error when a size of the mesh LUT block is larger than internal storage allocated for a mesh LUT block, and a back mapping component configured to back map the first perspective warped coordinates to coordinates in an input frame using the mesh LUT block, compute a bounding box for an input frame block corresponding to the output block based on the coordinates in the input frame, and detect and report a second run-time error when a size of the input frame block is larger than internal storage of the GCE allocated for an input frame block.

DETAILED DESCRIPTION

Figure 1:
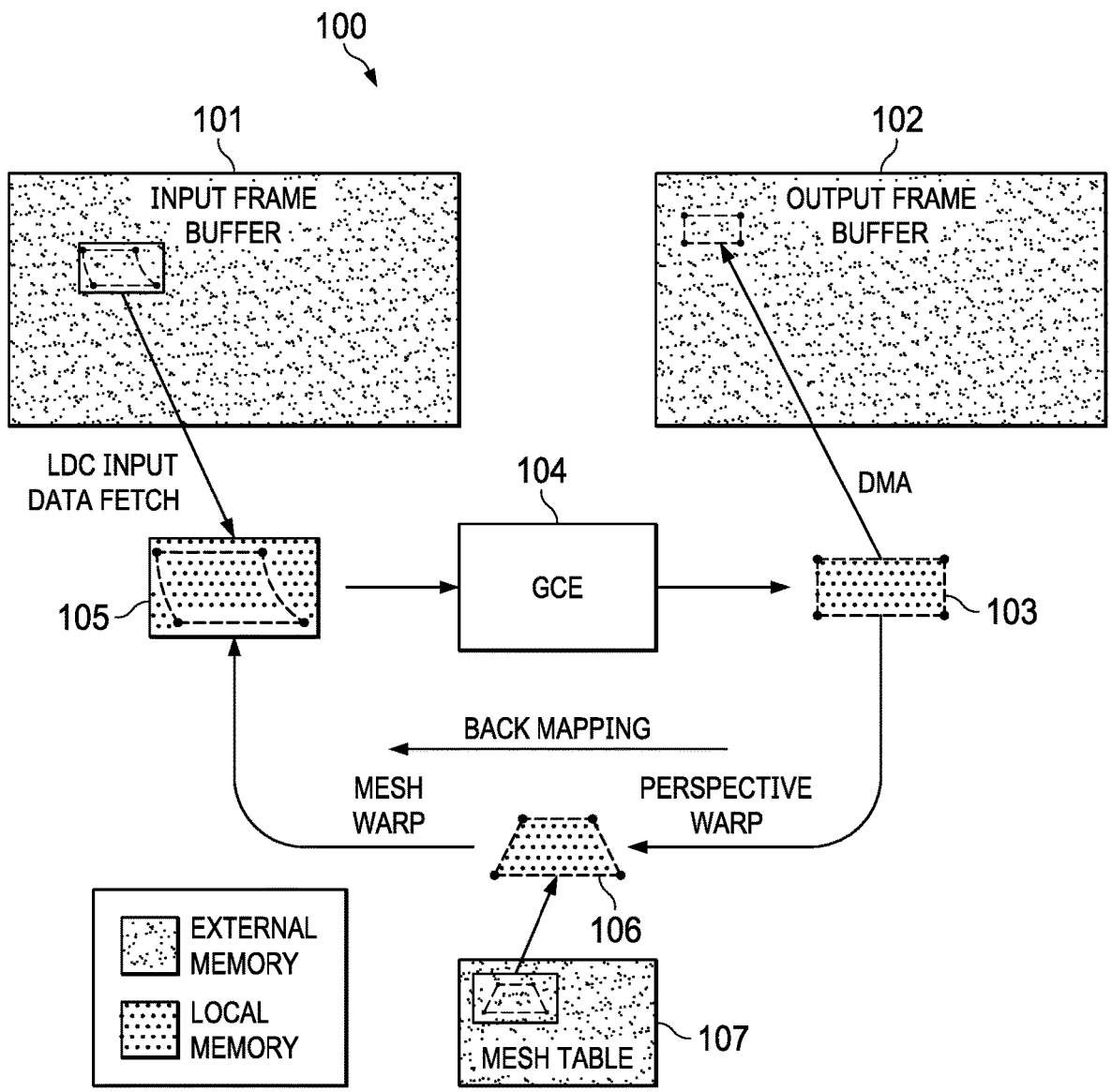
FIG. 1 illustrates the general operation of a geometric correction engine (GCE)

Specific embodiments of the disclosure are described herein in detail with reference to the accompanying figures. Like elements in the various figures are denoted by like reference numerals for consistency.

FIG. 1 illustrates the general operation of a geometric correction engine (GCE) 104 in accordance with embodiments of the disclosure. To correct a distorted image, the GCE 104 uses a technique referred to as "back mapping" in which coordinates of the pixels in the distorted input image are determined as a function of coordinates of pixels in the undistorted output image. Correction involves back mapping each output pixel location to a pixel location in an input distorted image.

The GCE 104 operates on an input image block by block. An output frame buffer 102 is divided into blocks and each output block is back mapped by the GCE 104 to a block of an input frame in an input frame buffer 101 using a mesh lookup table (LUT) 107 that provides a mapping of pixel locations in an output image to corresponding locations in an input image. For example, the GCE 104 performs perspective warping on the coordinates of the four corners of an output block 103 and used the warped coordinates to locate a corresponding block 106 in the mesh table 107. The GCE 104 then calculates the coordinates of the corners of the input block 105 to be used to generate the output block 103 by applying back mapping on the perspective warped corner pixel coordinates of the output block 103 using the mesh table block 106. The input block 105 is fetched from the input frame buffer 101 and the GCE 104 generates the output image block 103 using the input image block 105.

Figure 2A:
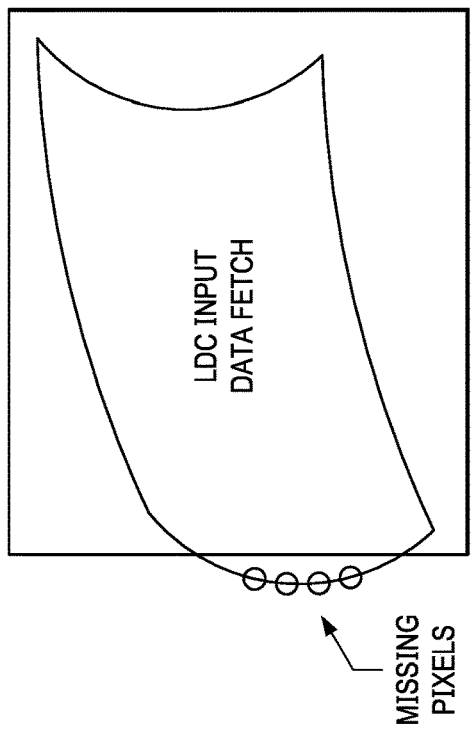
FIGS. 2A-2C are examples of artifacts in output images when run-time errors occur in a GCE.
Figure 2B:
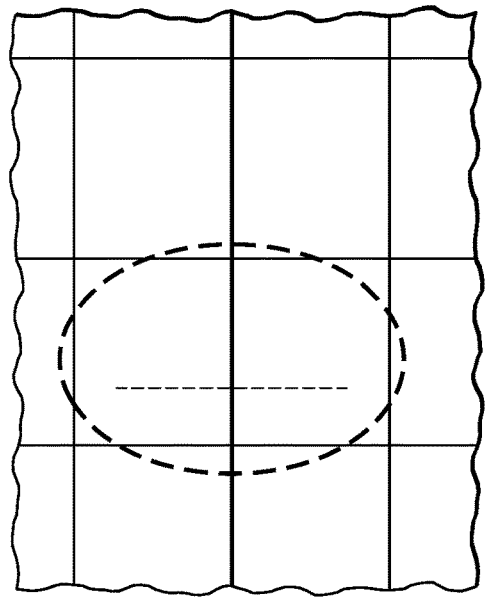
Figure 2C:
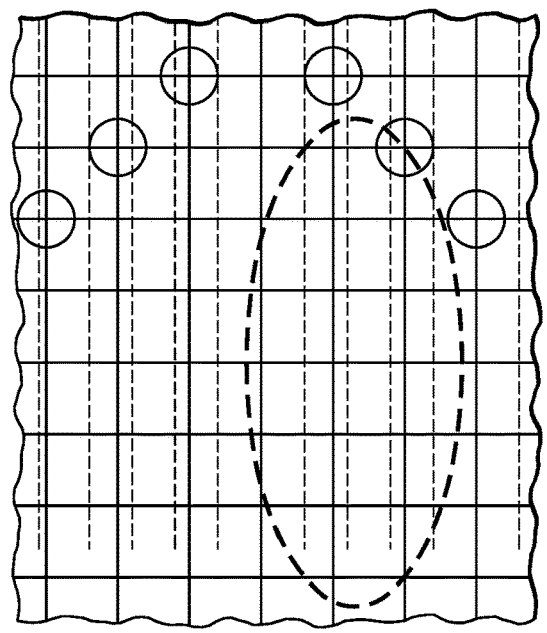

A GCE such as the GCE 104 has several configuration parameters the values of which a user may determine offline by simulation. The GCE may have run-time errors due to issues such as limited internal memory, limited precision of integer arithmetic in the GCE, and/or unsafe or aggressive user supplied configuration parameters for the GCE. The GCE may produce artifacts in output images when run-time errors occur. For example, as illustrated in FIG. 2A, the limited precision of integer arithmetic can affect the calculation of the coordinates of the desired block of the input image such that some of the needed pixels are not in the fetched input image block. In another example, shown in FIG. 2B, aggressive setting of a parameter by a user results in vertical artifacts in the output image. In another example, shown in FIG. 2C, the size of the output block, as set by user parameters, exceeds the size of the internal memory, resulting in horizontal artifacts in the output image.

Users prefer to use more aggressive GCE parameters to save memory bandwidth without worrying about output image artifacts at run time. Further, users want to allow changes to GCE parameters in real time and to be able to determine quickly if the parameter changes are safe, e.g., to allow the angle of view in an automotive surround view system to be changed dynamically by a driver or to provide real time calibration of cameras in an automotive surround view system. Prior art implementations of GCEs have not provided for graceful error handling and concealment of the impact of errors, i.e., artifact concealment.

Embodiments of the disclosure provide for reporting of run-time errors in a GCE due to issues such as aggressive parameter values, dynamic changes in parameter values due to view changes, e.g., by a driver, and/or real-time camera calibration, and for automatic concealment of artifacts caused by some of the run-time errors. In some embodiments, artifact causing errors are signaled to a user specified control program via interrupts, which allows the control program to modify GCE parameters in real time to avoid future errors. Further, the GCE may conceal visual artifacts in the output image caused by some errors by approximating the missing pixel data with the nearest available neighboring pixel data.

Figure 3:
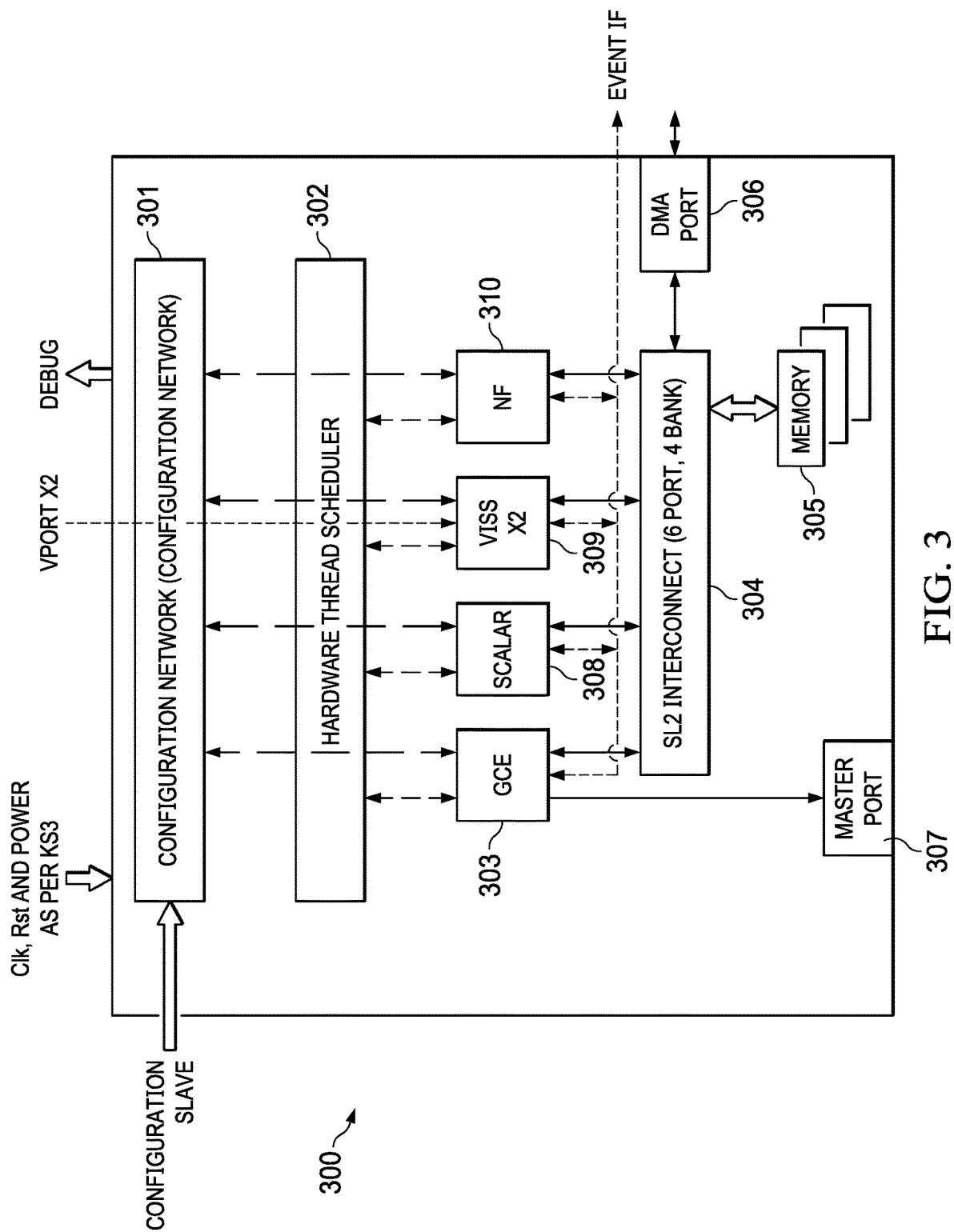
FIG. 3 is a block diagram illustrating an example of a video processing accelerator (VPAC) incorporating a GCE.

FIG. 3 is a block diagram illustrating an example of a video processing accelerator (VPAC) 300 incorporating a GCE 303 in accordance with some embodiments. The VPAC 300, which may be included in a system-on-a-chip (SoC) includes the GCE 303, a scalar component 308, a noise filter (NF) component 310, two vision imaging sub-systems (VISS) 309, a hardware thread scheduler 302, a configuration component 301, a shared memory interconnect 304, local shared memory 305, a direct memory access (DMA) port 306, and a master port 307.

The GCE 303 reads input images via the master port 307 and performs geometric correction, e.g., geometric distortion correction, perspective transformation, and/or rotational video stabilization, on the images to generate output images as described herein. The output of the GCE 303 can be sent to external memory or to other hardware components such as the scalar component 308 or the noise filter component 310 for further pre-processing via local shared memory 305.

The scalar component 308 reads data from shared memory 304 and generates scaled outputs with various scaling ratios. The output of the scalar component is stored in local shared memory 305 and can be filtered by the noise filter component 310 or written to external memory.

The noise filter component 310 performs bilateral filtering to remove noise. The output of the noise filter component can be sent to external memory from local shared memory 305 or can be further re-sized by the scalar component 308. The local shared memory 305 is used to exchange data across hardware components such as the GCE 303, the scalar component 308, and the noise filter component 310 as well as to the DMA port 306.

The vision imaging subsystems 309 perform raw data image processing such as defect pixel correction, lens shading correction, global/local brightness and contrast enhancement, demosaicing, and color conversion.

The hardware thread scheduler 302 is used for communication among the various hardware components of the VPAC 300. The configuration manager 301 is used by external configuration software executing on a processor in the SoC to set parameter values of the various hardware components. The VPAC 300 may further include typical hardware inputs such as clock, reset, network, data, and debug signals and hardware outputs such as interrupt signals.

Figure 4:
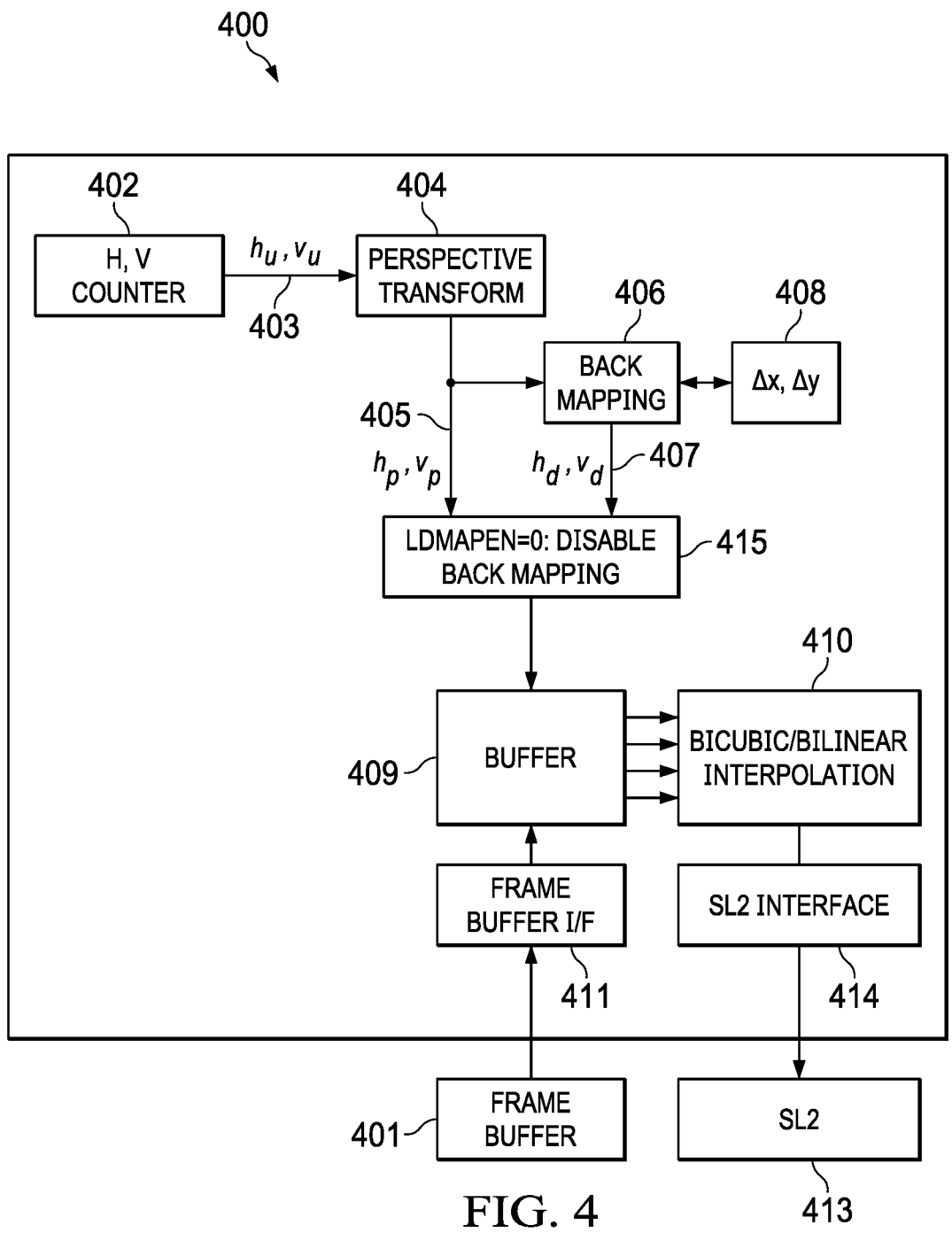
FIG. 4 is a block diagram of an example GCE.

FIG. 4 is a block diagram of an example GCE 400, e.g., the GCE 303 of FIG. 3, in accordance with some embodiments. As is explained in more detail herein in reference to FIG. 6, the GCE 400 is configured to report run-time errors that may occur at various points in the GCE processing. Further, for some of the run-time errors, the GCE 400 is configured to conceal artifacts in the output frame resulting from these errors.

Figure 5:
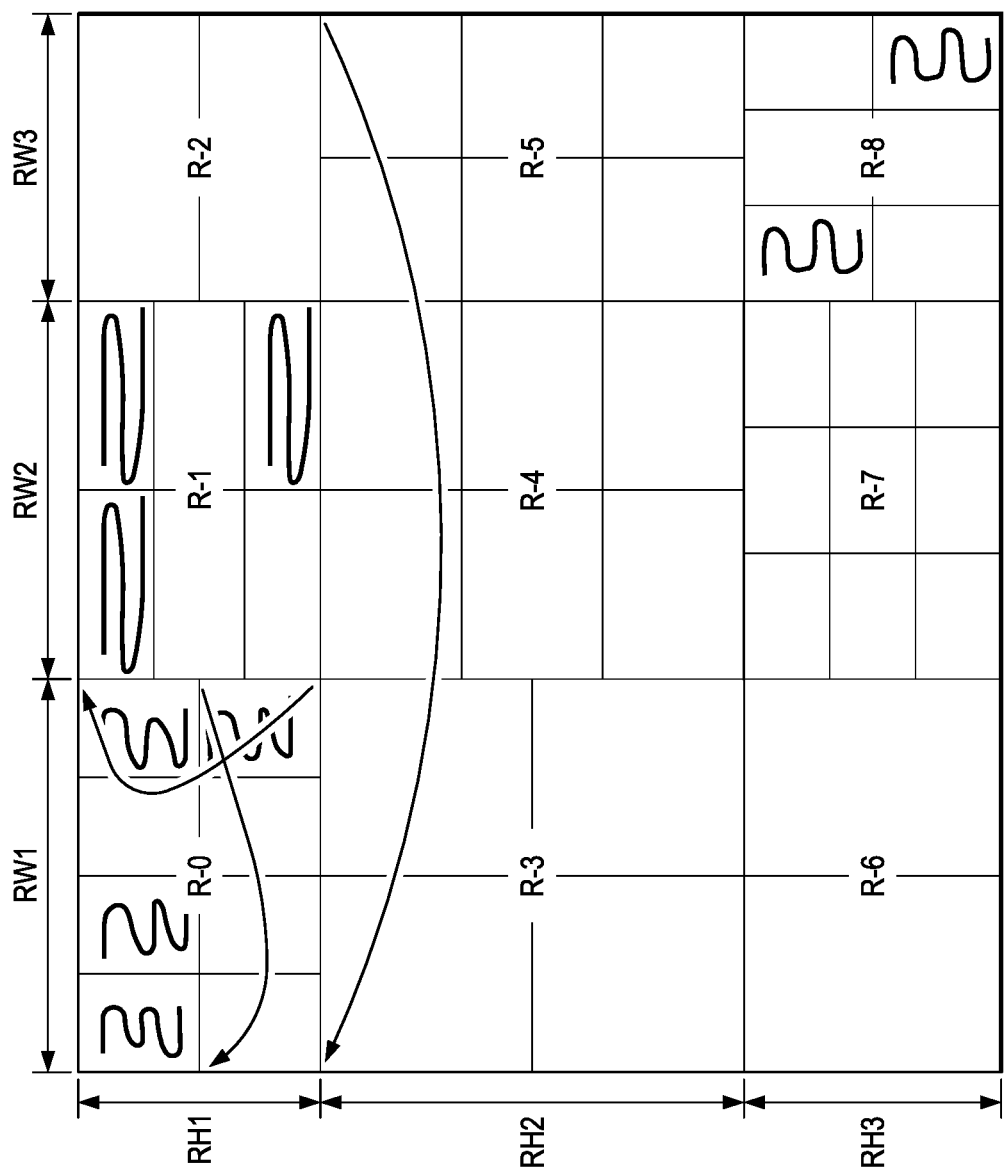
FIG. 5 is an example illustrating division of an output frame into nine regions in which each region has a different block size.

The GCE 400 performs geometric correction operations on blocks of an input frame to generate corresponding blocks of an output frame. More specifically, the output frame may be generated using a single user specified output block size for the entire output frame or the output frame may be divided into up to nine regions via user specified configuration parameters and each region may have a region specific output block size also specified by the user. FIG. 5 is an example illustrating division of an output frame into nine regions in which each region has a different block size. A user supplied control program executing on a processor of a system-on-a-chip incorporating the GCE 400 supplies the configuration parameter values specifying the number of regions, the sizes of the regions, and the size of the output block in each region. Additional information regarding division of output frames into multiple regions and output block sizes for processing by a GCE may be found, for example, in United States Patent Publication No. 2019/0096041, filed Sep. 25, 2017, which is incorporated by reference herein. The GCE 400 operates on each region in raster scan order to generate geometrically corrected output blocks from corresponding blocks in the input frame.

The GCE 400 includes a counter component 402, a transform component 404, a back mapping component 406, a mesh lookup table (LUT) 408, a muxing component 415 configured to select whether to use the output of the transform component 404 or the back mapping component 406, a buffer 409, an interpolation component 410, a frame buffer interface 411 coupled to external memory 401 incorporating a frame buffer for the input frame, and a shared memory interface 414 coupled to an external shared memory 413 where the geometrically corrected output frame is stored. A brief description of these components is provided herein. Additional detail regarding the operation of examples of such components may be found in the previously cited U.S. Patent Publication No. 2019/0096041.

The counter component 402 is configured to compute coordinates 403 of pixel locations in an output block in the output frame for the region being processed. The computation of the coordinates is based on the user specified size of output blocks in the region, the user specified size of the region, and the position of the output block in the raster scan order processing of the region.

The transform component 404 and the back mapping component 406 are configured to generate coordinates 407 of a displaced pixel in the input frame corresponding to the coordinates in the output block computed by the counter block 402. The transform component 404 is configured to apply an affine and/or perspective transform to the output block pixel coordinates to generate perspective warped output block coordinates 405 if enabled by the user supplied control program. If application of a transform is not enabled, the transform component block 404 outputs the unaltered coordinates of the output block generated by the counter component.

The back mapping component 406 is configured to generate the coordinates 407 of the displaced pixel in the input frame corresponding to the output block coordinates received from the transform component 404. The corresponding coordinates in the input image may be calculated by combining the received output coordinates with offsets from the user supplied mesh lookup table (LUT) 408 located based on the received output block coordinates. The mesh LUT 408, which may also be referred to as an offset table, is a regular grid mapping locations of pixels in the output frame to corresponding locations in the input frame and is provided by the user. The mesh LUT 408 defines an offset vector (Δx, Δy) for locations in the output frame. The grid may be fully sampled or down sampled. A fully sampled grid defines an offset vector for each output pixel, defining exactly where to fetch the input data to compute the output pixel. If the grid is subsampled, bilinear interpolation is used to interpolate missing offset vectors.

The buffer 409 is configured to receive and store input pixels retrieved from the frame buffer in external memory 401 via the frame buffer interface 411. The input pixels correspond to the pixel coordinates generated by the back mapping component 406 if back mapping is enabled or to pixel coordinates output by the transform component 404 if back mapping is not enabled.

The interpolation component 410 is configured to interpolate input pixel values received from the buffer component 409 using either bicubic or bilinear interpolation as specified by the user supplied configuration program to generate the value of the output pixels, i.e., the values of the output pixels at the coordinates generated by the counter component 402. After the interpolation, the geometrically corrected output block is stored in an output frame buffer in the SL2 shared memory 413 via the SL2 interface 414.

Figure 6:
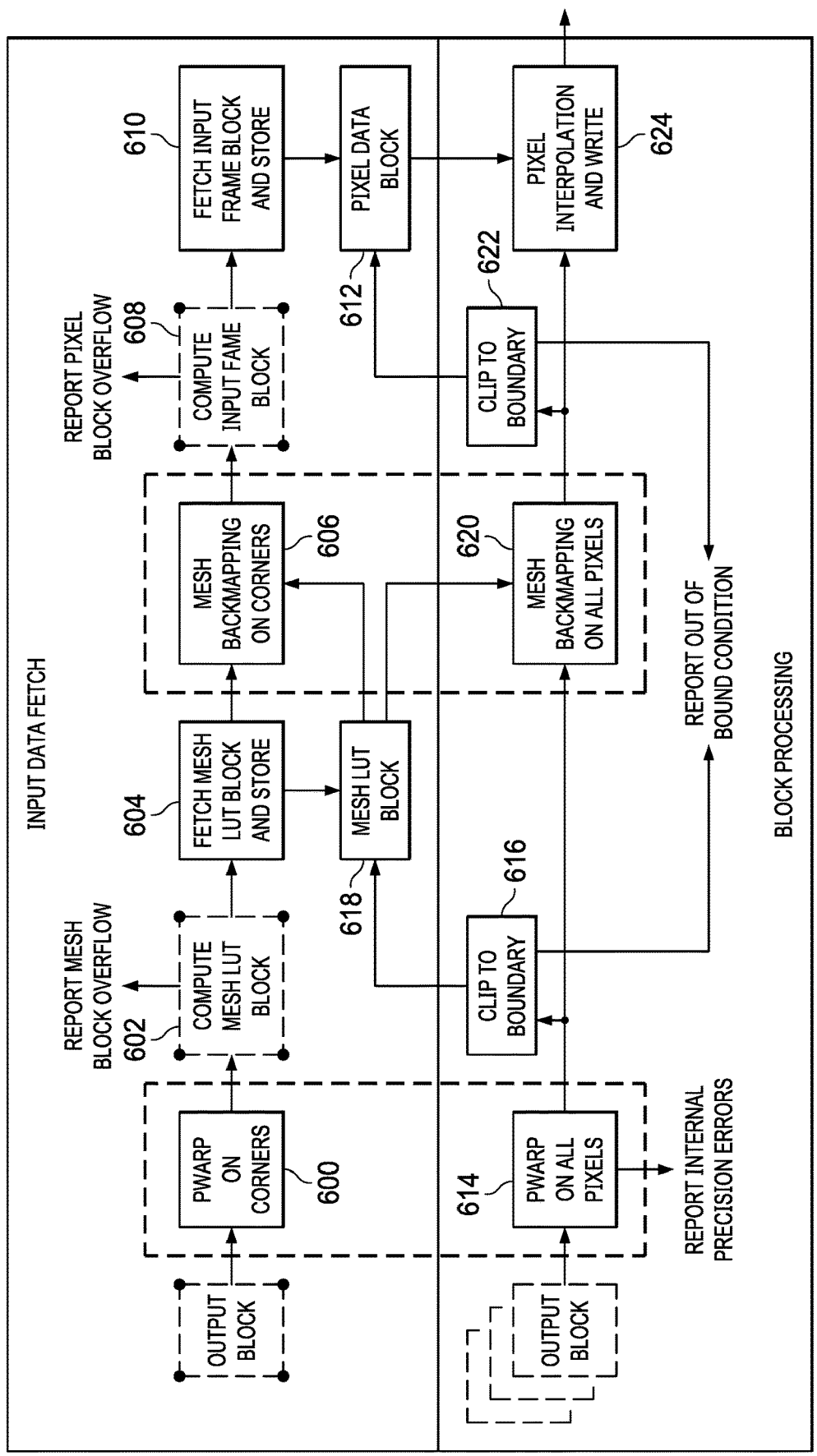
FIG. 6 is an example illustrating the operation of the GCE of FIG. 4.

FIG. 6 is an example illustrating the operation of the GCE 400. For simplicity of explanation, the example assumes applying a perspective transform and back mapping are enabled and the mesh LUT is sub-sampled. For an output block in a region of the output frame, the counter component 402 calculates the coordinates of the four corners of the output block, and the transform component 404 applies a perspective transform 600 to these coordinates to generate perspective warped coordinates for the back mapping component 406.

Figure 7:
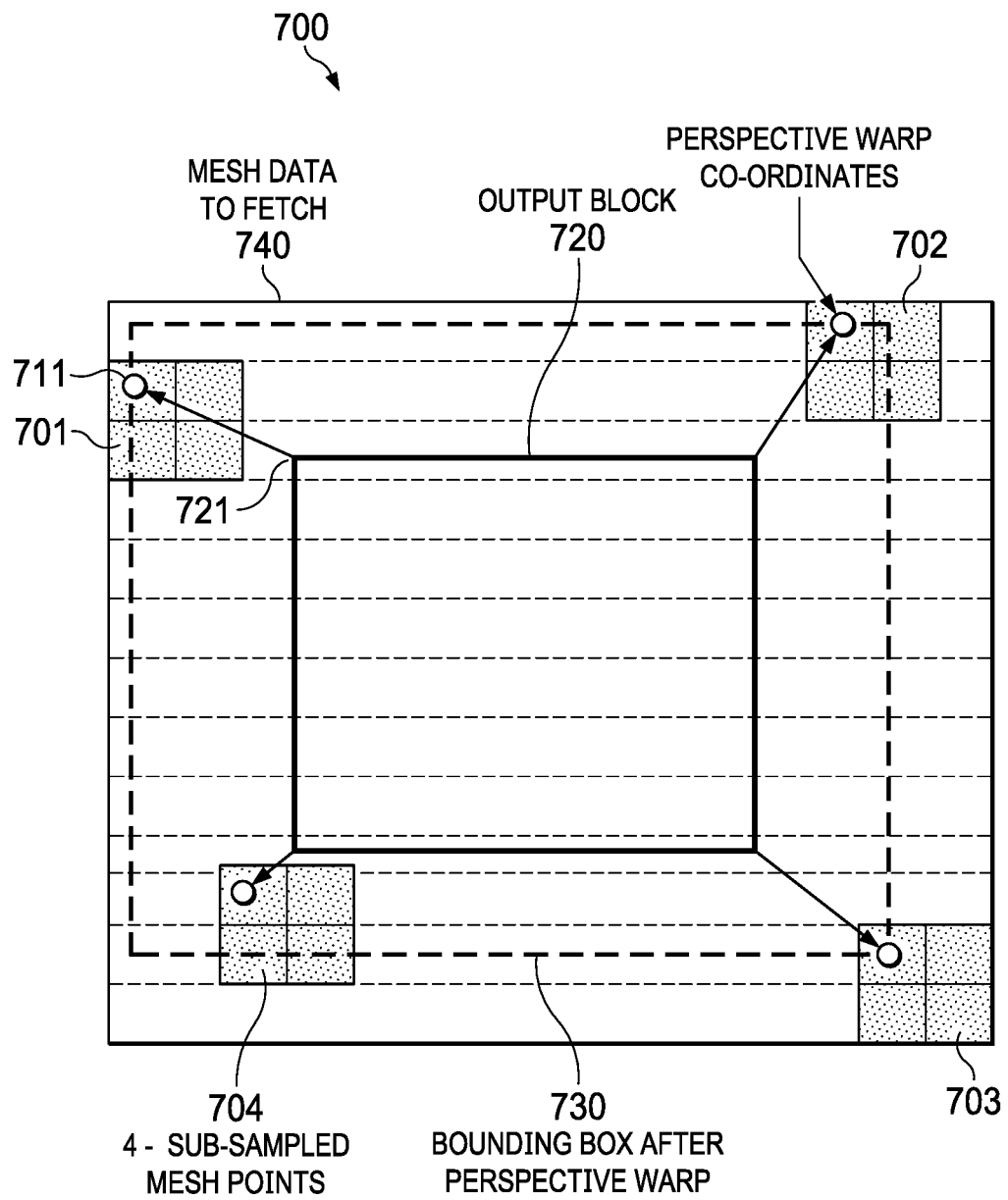
FIG. 7 is an example illustrating a bounding block for fetching mesh data.

The perspective warped coordinates are used by the transform component 404 to compute 602 the corner coordinates in the mesh LUT 408 of a mesh LUT block 618 corresponding to the output block. More specifically, the transform component 404 computes a rectangular bounding box 740 such as that shown in the example of FIG. 7 for the mesh data to fetch, e.g., the mesh LUT block 618, such that the bounding box 740 contains mesh points corresponding the four perspective warped corner coordinates, e.g., corner 711. FIG. 7 shows an example output block 720 and the bounding box 730 of the output block 720 given the perspective warped coordinates of the corners of the output block 720. The back mapping component 406 uses bilinear interpolation to up-sample the sub-sampled mesh points 701, 702, 703, 704 to pixel co-ordinate precision. For the mesh point bilinear interpolation, the bounding box after perspective warp 730 is extended by one column to the right and one row at the bottom to form the rectangular bounding box 740.

If the size of the mesh LUT block 618 is larger than the internal storage allocated in the buffer 409 for a mesh LUT block and/or any boundary of the block exceeds the hardware address size, the transform component 404 causes a mesh block overflow event to be reported. The transform component 404 will cause this event to be reported once for each mesh block for which this error occurs along with the left top corner coordinates of the corresponding output block. This event may be referred to as mesh_iblk_memovf herein. This run-time error condition can cause visible corruption in one or more output blocks. This error may occur, for example, due to an output block size that is too large, incorrect values of parameters for the affine or perspective transforms, or a too small sub-sampling factor for the mesh LUT.

Referring again to FIG. 6, the GCE 400 fetches 604 the mesh LUT block 618 corresponding to the mesh table bounding block computed by the transform component 404 and stores the mesh LUT block 618 in the buffer 409. The back mapping component 406 then back maps 606 the perspective warped corners of the output block computed by the transform component 404 to coordinates in the input frame using the mesh LUT block 618 and uses the back mapped corner coordinates to compute 608 a bounding box for the input frame block corresponding to the output block. The back mapping component 406 applies additional padding, e.g., one or more additional rows and columns of pixels, around the back mapped coordinates to compute the final coordinates of the input bounding box. The amount and location of the padding depends on the type of interpolation to be performed by the interpolation component 410. Additional user defined padding may also be applied in all directions to compute the final bounding box. The GCE 400 fetches 610 the input frame block 612 identified by the computed input bounding block and stores the input frame block 612 in the buffer 409.

If the size of the input frame block 612 is larger than the internal storage allocated in the buffer 409 for an input frame block and/or any boundary of the block exceeds the hardware address size, the back mapping component 406 causes a pixel block overflow event to be reported. The back mapping component 406 will cause this event to be reported once for each input block for which the error occurs along with the left top corner coordinates of the corresponding output block. This event may be referred to as pix_iblk_memovf herein. This run-time error condition can cause visible corruption in one or more output blocks. This error may occur, for example, due to an output block size that is too large.

Once the input data needed to generate the output block, i.e., the mesh LUT block 618 and the input frame block 612, is available, the GCE 400 performs block processing to generate the pixel values of the output block from corresponding geometrically corrected pixels of the input frame block 612. The counter component 402 computes the coordinates of each pixel location in the output block in raster scan order and provides the coordinates to the transform component 404.

The transform component 404 applies a perspective transform 614 to these coordinates to generate perspective warped coordinates for the back mapping component 406. If the values of intermediate variables of an affine or perspective transform operation exceed what the GCE hardware can support, the transform component 404 causes an internal precision error event to be reported for the first occurrence of this error in each frame. This error may occur, for example, due to incorrect values of user specified transform coefficients. When such errors occur, the transform component 404 clips the intermediate variable values to the size the hardware supports. This event may be referred to as int_szovf herein.

Further, if the perspective warped coordinates are outside the boundaries of the mesh LUT, i.e., outside the frame size for which mesh data is available in the mesh LUT, the transform component 404 clips 616 the coordinates to the boundary of the mesh LUT. In addition, the transform component 404 causes a frame out of bound event to be reported for the first occurrence of this error in each frame. This event may be referred to as ifr_outofbound herein.

Further, if the perspective warped coordinates are outside the boundaries of the mesh LUT block 618, the transform component 404 clips 616 the out-of-bounds coordinates to the boundary of the mesh LUT block 618. In addition, the transform component 404 causes a mesh block out of bound event to be reported for the first occurrence of this error in each frame. This event may be referred to as mesh_iblk_outofbound herein.

The back mapping component 406 back maps 620 the perspective warped coordinates of the output pixel location computed by the transform component 404 to coordinates in the input frame block 612 using the mesh LUT block 618. Further, if the input frame block coordinates are outside the boundaries of the input frame, the back mapping component 406 clips 622 the coordinates to the boundary of the input frame. In addition, the back mapping component 406 causes a frame out of bound event to be reported for the first occurrence of this error in each frame. This event may be referred to as ifr_outofbound herein.

Further, if the input block coordinates are outside the boundaries of the input frame block 612, the p mapping component 406 clips 622 the out-of-bounds coordinates to the boundary of the input frame block 612. The clipping of the out-of-bounds coordinates has the effect of concealing any artifacts in the output block that would otherwise have occurred due to this error. In addition, the back mapping component 406 causes an input block out of bound event to be reported for the first occurrence of this error in each frame along with the left top corner coordinates of the corresponding output block. This event may be referred to as pix_i-blk_outofbound herein.

The pixel value to be stored at the output block coordinates is then interpolated 624 by the interpolation component 410 based on the coordinates provided by the back mapping component. For example, if bi-cubic interpolation is selected, the output pixel value is interpolated from the sixteen pixel values in a 4×4 grid around the location indicated by the input block coordinates. If bilinear interpolation is selected, the output pixel value is interpolated from the four pixels values in a 2×2 grid around the location indicated by the input block coordinates.

Figure 8:
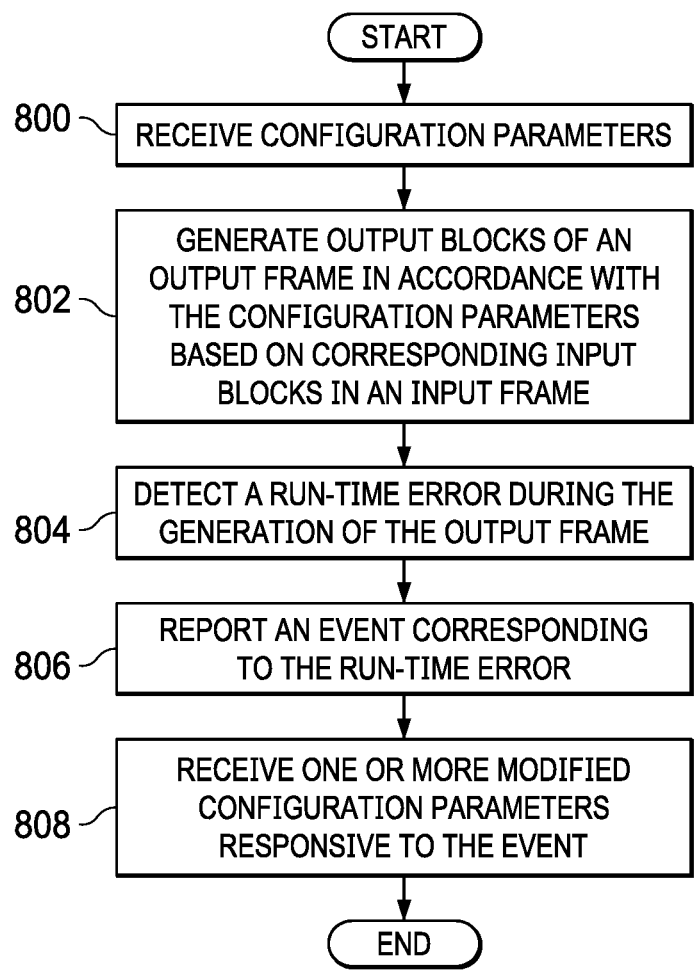
FIG. 8 is a flow diagram of a method for error handling in a GCE.

FIG. 8 is a flow diagram of a method for error handling in a GCE, e.g., the GCE 400 of FIG. 4, in accordance with some embodiments. Initially, the GCE receives 800 configuration parameters from a user supplied control program for performing geometric correction to generate an output frame. Examples of such configuration parameters are previously described herein. The GCE then generates output blocks of the output frame in accordance with the configuration parameters based on input blocks of an input frame. Generation of output blocks is previously described herein. During the generation of the output blocks, the GCE may detect 804 a run-time error as previously described herein. When a run-time error is detected, the GCE reports 806 an event corresponding to the run-time error to the user supplied control program. Depending on the particular run-time error, the GCE may also perform corrective actions appropriate to the error as previously described herein, e.g., clipping coordinates to boundaries, to conceal potential artifacts in the output image that would result from the run-time error. Responsive to the particular run-time error, the user supplied control program may modify one or more configuration parameters, and the GCE will receive 808 the modified configuration parameters for use in generating another output frame.

Figure 9:
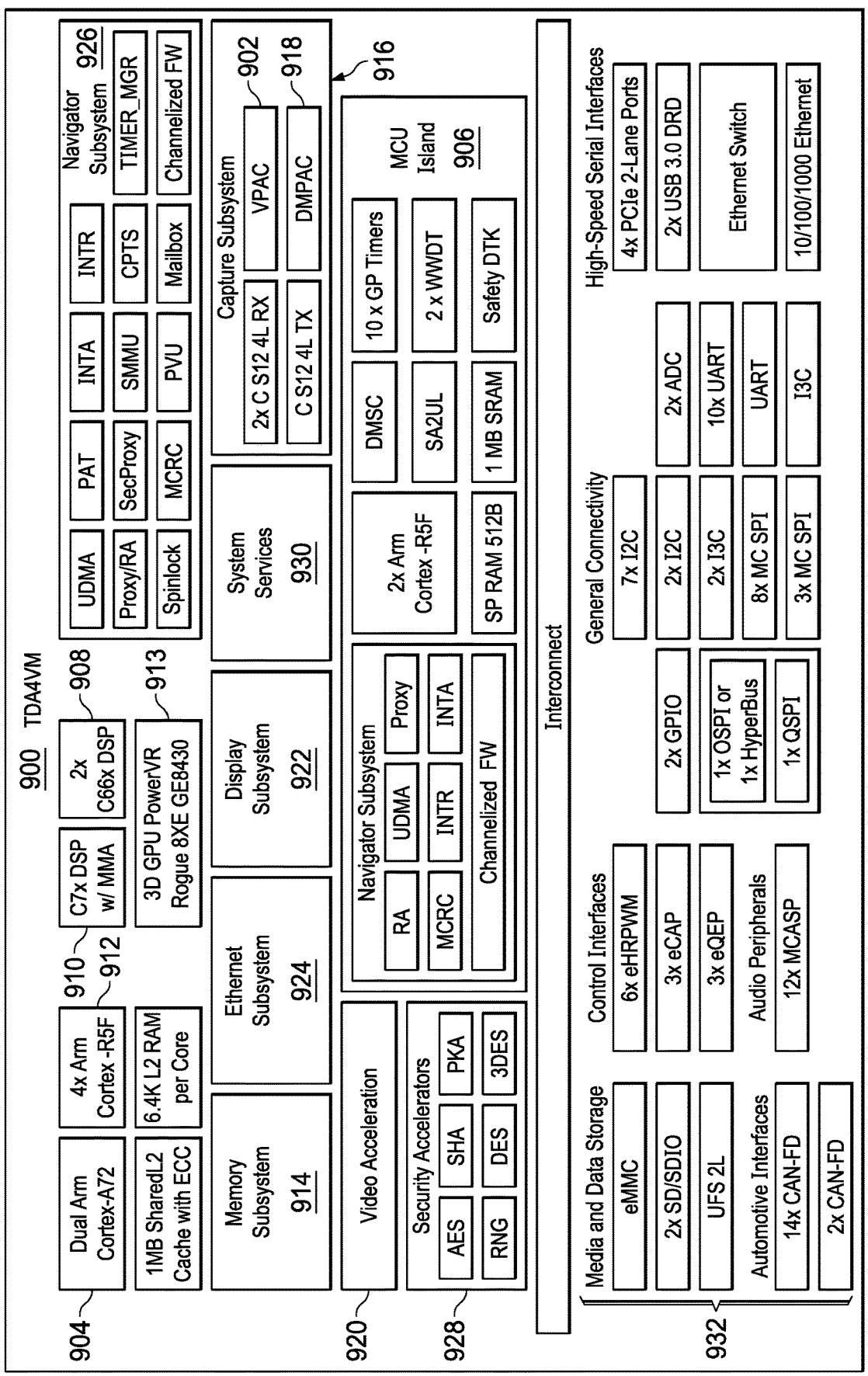
FIG. 9 is a high level block diagram of an example multiprocessor system on a chip (SoC).

FIG. 9 is a high level block diagram of an example multiprocessor system-on-a-chip (SoC) 900 that may be configured to perform embodiments of error handling in a GCE as described herein. In particular, the example SoC 900 is an embodiment of the TDA4VM SoC available from Texas Instruments, Inc. A high level description of the components of the SoC 900 is provided herein. More detailed descriptions of example components may be found in "TDA4VM Jacinto™ Automotive Processors for ADAS and Autonomous Vehicles Silicon Revision 1.0," Texas Instruments, SPRSP36E, February, 2019, revised December, 2019, pp. 1-311, which is incorporated by reference herein.

The SoC 900 includes numerous subsystems across different domains such as one dual-core 64-bit Arm® Cortex®-A72 microprocessor subsystem 904, a microcontroller unit (MCU) island 906, based on two dual-core Arm® Cortex®-R5F MCUs, four additional dual-core Arm® Cortex®-R5F MCUs 912 in the main domain, two C66x floating point digital signal processors (DSPs) 908, one C71x floating point, vector DSP 910, that includes a deep-learning matrix multiply accelerator (MMA), and 3D graphics processing unit (GPU) 913. The SoC 900 further includes a memory subsystem 914 including up to 8 MB of on-chip static random access memory (SRAM), an internal DMA engine, a general purpose memory controller (GPMC), and an external memory interface (EMIF) module (EMIF). In addition, the SoC 900 includes a capture subsystem 916 with two camera streaming interfaces, a vision processing accelerator (VPAC) 902 including a GCE, a depth and motion processing accelerator (DMPAC) 918, and a video acceleration module 920. The SoC 900 also includes a display subsystem 922, an ethernet subsystem 924, a navigator subsystem 926, various security accelerators 928, support for system services 930, and a variety of other interfaces 932.

Software instructions implementing a user supplied control program as described herein may be stored in the memory subsystem 914 (e.g., a computer readable medium) and may execute on one or more programmable processors of the SOC 900, e.g., the DSP 910. Further, the GCE in the VPAC 902 may be, for example, an embodiment of the GCE 400 of FIG. 4.

OTHER EMBODIMENTS

While the disclosure has been described with respect to a limited number of embodiments, those skilled in the art, having benefit of this disclosure, will appreciate that other embodiments can be devised which do not depart from the scope disclosed herein.

For example, embodiments have been described herein in which corner coordinates of the output block for which an error occurred are reported for some of the error events. In other embodiments, a bounding block covering all output blocks in a region corresponding to an error event, i.e., incurring the run-time error corresponding to the error event, may be reported for some error events, e.g., mesh_iblk_memovf, pix_iblk_memovf, int_szovf, pix_iblk_outofbound, and ifr_outofbound. In some such embodiments, options are provided such that a user program can choose to have a bounding block reported for mesh_iblk_memovf, pix_iblk_memovf, and int_szovf or for all five events. In all such embodiments, after the GCE completes processing of an image, the user supplied control program can check for such bounding boxes. The user supplied control program can choose to cause the GCE to execute again on the area(s) identified by the bounding box(es) with different parameters, in which case the output of the GCE for the area(s) will replace the output from the original execution of the GCE. The user supplied control program can also choose to modify configuration parameters of the GCE for processing the next image rather than attempting to change the GCE output for the current image.

It is therefore contemplated that the appended claims will cover any such modifications of the embodiments as fall within the true scope of the disclosure.

What is claimed is:

1. An integrated circuit device comprising:
a hardware accelerator that includes:
a buffer:
a memory configured to store an input frame that includes a set of input blocks; and
a processing circuit coupled to the memory and configured to:
receive a set of configuration parameters;
perform an operation on the set of input blocks to produce a set of output blocks of an output frame, wherein the operation includes:
identifying an input block of the set of input blocks that corresponds to the output block based on a pixel location associated with the output block;
retrieving the input block from the memory; and
performing a geometric correction on the input block to produce the output block, wherein the geometric correction includes generating a mesh that maps pixels of the output block to pixels of the input block;
determine whether an error associated with the operation occurred, wherein the error is associated with a size of the mesh exceeding a capacity of the buffer; and
determine whether to report an event based on whether the error occurred.

2. The integrated circuit device of claim 1, wherein:
the error is a first error;
the event is a first event; and
the processing circuit is configured to:
determine whether an internal precision error associated with the operation occurred; and
determine whether to report a second event based on whether the internal precision error occurred.

3. The integrated circuit device of claim 1 further comprising a processor coupled to the hardware accelerator and configured to provide the set of configuration parameters, wherein the hardware accelerator is configured to report the event to the processor.

4. The integrated circuit device of claim 1, wherein the reporting of the event includes specifying a bounding box of a region that includes an output block of the set of output blocks associated with the error.

5. An integrated circuit device comprising:
a hardware accelerator that includes:
a memory configured to store an input frame that includes a set of input blocks; and
a processing circuit coupled to the memory and configured to:
receive a set of configuration parameters;
perform an operation on the set of input blocks to produce a set of output blocks of an output frame, wherein the operation includes:
identifying an input block of the set of input blocks that corresponds to the output block based on a pixel location associated with the output block;
retrieving the input block from the memory; and
performing a geometric correction on the input block to produce the output block, wherein the geometric correction includes generating a mesh that maps pixels of the output block to pixels of the input block;
determine whether an error associated with the operation occurred, wherein the error is associated with an address associated with the mesh exceeding a maximum address size; and
determine whether to report an event based on whether the error occurred.

6. The integrated circuit device of claim 5, wherein the reporting of the event includes reporting of at least one of: a set of coordinates associated with an output block of the set of output blocks associated with the error or a bounding box of a region that includes the output block associated with the error.

7. An integrated circuit device comprising:
a hardware accelerator that includes:
a memory configured to store an input frame that includes a set of input blocks; and
a processing circuit coupled to the memory and configured to:
receive a set of configuration parameters;
perform an operation on the set of input blocks to produce a set of output blocks of an output frame, wherein the operation includes:
identifying an input block of the set of input blocks that corresponds to the output block based on a pixel location associated with the output block;
retrieving the input block from the memory; and
performing a geometric correction on the input block to produce the output block, wherein the geometric correction includes:
generating a mesh that maps pixels of the output block to pixels of the input block; and
generating a set of warped coordinates based on the mesh;
determine whether an error associated with the operation occurred, wherein the error is associated with the set of warped coordinates being outside a boundary of the mesh; and
determine whether to report an event based on whether the error occurred.

8. The integrated circuit device of claim 7, wherein the reporting of the event includes reporting of at least one of: a set of coordinates associated with an output block of the set of output blocks associated with the error or a bounding box of a region that includes the output block associated with the error.

9. An integrated circuit device comprising:
a hardware accelerator that includes:
- a memory configured to store an input frame that includes a set of input blocks; and
- a processing circuit coupled to the memory and configured to:
  - receive a set of configuration parameters;
  - perform an operation on the set of input blocks to produce a set of output blocks of an output frame, wherein the operation includes:
    - identifying an input block of the set of input blocks that corresponds to the output block based on a pixel location associated with the output block;
    - retrieving the input block from the memory; and
    - performing a geometric correction on the input block to produce the output block, wherein the geometric correction includes:
      - generating a mesh that maps pixels of the output block to pixels of the input block; and
      - generating a set of warped coordinates based on the mesh;
  - determine whether an error associated with the operation occurred, wherein the error is associated with the set of warped coordinates being outside a boundary of the input block; and
  - determine whether to report an event based on whether the error occurred.

10. The integrated circuit device of claim 9, wherein the reporting of the event includes reporting of at least one of: a set of coordinates associated with an output block of the set of output blocks associated with the error or a bounding box of a region that includes the output block associated with the error.

11. An integrated circuit device comprising:
a hardware accelerator that includes:
- a memory configured to store an input frame that includes a set of input blocks; and
- a processing circuit coupled to the memory and configured to:
  - receive a set of configuration parameters;
  - perform an operation on the set of input blocks to produce a set of output blocks of an output frame, wherein the operation includes:
    - identifying an input block of the set of input blocks that corresponds to the output block based on a pixel location associated with the output block;
    - retrieving the input block from the memory; and
    - performing a geometric correction on the input block to produce the output block, wherein the geometric correction includes:
      - generating a mesh that maps pixels of the output block to pixels of the input block; and
      - generating a set of warped coordinates based on the mesh;
  - determine whether an error associated with the operation occurred, wherein the error is associated with the set of warped coordinates being outside a boundary of the input frame; and
  - determine whether to report an event based on whether the error occurred.

12. The integrated circuit device of claim 11, wherein the reporting of the event includes reporting of at least one of: a set of coordinates associated with an output block of the set of output blocks associated with the error or a bounding box of a region that includes the output block associated with the error.

13. An integrated circuit device comprising:
a hardware accelerator that includes:
- a buffer;
- a memory configured to store an input frame that includes a set of input blocks; and
- a processing circuit coupled to the memory and configured to:
  - receive a set of configuration parameters;
  - perform an operation on the set of input blocks to produce a set of output blocks of an output frame, wherein the operation includes:
    - identifying an input block of the set of input blocks that corresponds to the output block based on a pixel location associated with the output block;
    - retrieving the input block from the memory; and
    - performing a geometric correction on the input block to produce the output block;
  - determine whether an error associated with the operation occurred, wherein the error is associated with a size of the input block exceeding a capacity of the buffer; and
  - determine whether to report an event based on whether the error occurred.

14. The integrated circuit device of claim 13, wherein the reporting of the event includes reporting of at least one of: a set of coordinates associated with an output block of the set of output blocks associated with the error or a bounding box of a region that includes the output block associated with the error.

15. An integrated circuit device comprising:
a hardware accelerator that includes:
- a memory configured to store an input frame that includes a set of input blocks; and
- a processing circuit coupled to the memory and configured to:
  - receive a set of configuration parameters;
  - perform an operation on the set of input blocks to produce a set of output blocks of an output frame, wherein the operation includes:
    - identifying an input block of the set of input blocks that corresponds to the output block based on a pixel location associated with the output block;
    - retrieving the input block from the memory; and
    - performing a geometric correction on the input block to produce the output block;
  - determine whether an error associated with the operation occurred; and
  - determine whether to report an event based on whether the error occurred, wherein the reporting of the event includes specifying a set of coordinates associated with an output block of the set of output blocks associated with the error.

16. An integrated circuit device comprising:
- a first memory configured to store a set of processor instructions;
- at least one processor coupled to the first memory and configured to execute the set of processor instructions to provide a set of configuration parameters; and
- a hardware accelerator coupled to the at least one processor and that includes:
  - a second memory configured to store a set of input blocks of pixels; and a processing circuit coupled to the second memory and configured to:
  receive the set of configuration parameters;
  perform an operation on the set of input blocks to produce a set of output blocks of pixels, wherein the operation includes, for an output block of the set of output blocks:
    identifying an input block of the set of input blocks that corresponds to the output block based on a pixel location associated with the output block;
    retrieving the input block from the second memory; and
    performing a geometric correction on the input block to produce the output block, wherein the geometric correction includes generating a mesh that maps pixels of the output block to pixels of the input block;
  determine whether an error associated with the operation occurred, wherein the error is associated with an address associated with the mesh exceeding a maximum address size; and
  determine whether to report an event to the at least one processor based on whether the error occurred.

17. The integrated circuit device of claim 16, wherein:
the error is a first error;
the event is a first event; and
the processing circuit is configured to:
  determine whether an internal precision error associated with the operation occurred; and
  determine whether to report a second event to the at least one processor based on whether the internal precision error occurred.

18. An integrated circuit device comprising:
a first memory configured to store a set of processor instructions;
at least one processor coupled to the first memory and configured to execute the set of processor instructions to provide a set of configuration parameters; and
a hardware accelerator coupled to the at least one processor and that includes:
  a second memory configured to store a set of input blocks of pixels; and
  a processing circuit coupled to the second memory and configured to:
    receive the set of configuration parameters:
    perform an operation on the set of input blocks to produce a set of output blocks of pixels, wherein the operation includes, for an output block of the set of output blocks:
      identifying an input block of the set of input blocks that corresponds to the output block based on a pixel location associated with the output block;
      retrieving the input block from the second memory; and
      performing a geometric correction on the input block to produce the output block, wherein the geometric correction includes:
        generating a mesh that maps pixels of the output block to pixels of the input block; and
        generating a set of warped coordinates based on the mesh;
    determine whether an error associated with the operation occurred, wherein the error is associated with one of: the set of warped coordinates being outside a boundary of the mesh, the set of warped coordinates being outside a boundary of the input block, or the set of warped coordinates being outside a boundary of the set of input blocks; and
    determine whether to report an event to the at least one processor based on whether the error occurred.

19. The integrated circuit device of claim 18, wherein the reporting of the event includes reporting, to the at least one processor, at least one of: a set of coordinates associated with an output block of the set of output blocks associated with the error or a bounding box of a region that includes an output block of the set of output blocks associated with the error.

20. An integrated circuit device comprising:
a buffer
a first memory configured to store a set of processor instructions;
at least one processor coupled to the first memory and configured to execute the set of processor instructions to provide a set of configuration parameters; and
a hardware accelerator coupled to the at least one processor and that includes:
  a second memory configured to store a set of input blocks of pixels; and
  a processing circuit coupled to the second memory and configured to:
    receive the set of configuration parameters:
    perform an operation on the set of input blocks to produce a set of output blocks of pixels, wherein the operation includes, for an output block of the set of output blocks:
      identifying an input block of the set of input blocks that corresponds to the output block based on a pixel location associated with the output block;
      retrieving the input block from the second memory; and
      performing a geometric correction on the input block to produce the output block;
    determine whether an error associated with the operation occurred, wherein the error is associated with a size of the input block exceeding a capacity of the buffer; and
    determine whether to report an event to the at least one processor based on whether the error occurred.

* * * * *